United States Patent [19]

Kunimatsu et al.

[11] Patent Number: 4,946,883
[45] Date of Patent: Aug. 7, 1990

[54] FLUORORUBBER COMPOSITIONS EXHIBITING IMPROVED WORKABILITY AND MECHANICAL PROPERTIES

[75] Inventors: Kaoru Kunimatsu; Atsushi Komatsu, both of Chiba, Japan

[73] Assignee: Toray Dow Corning Silicone, Tokyo, Japan

[21] Appl. No.: 453,900

[22] Filed: Dec. 20, 1989

[30] Foreign Application Priority Data

Jan. 26, 1989 [JP] Japan ................................. 1-17030.

[51] Int. Cl.$^5$ ................................................ C08K 5/24
[52] U.S. Cl. .................................... 524/265; 524/266; 525/104; 525/479
[58] Field of Search ................. 525/104, 479; 524/265, 524/266

[56] References Cited

U.S. PATENT DOCUMENTS 4,690,967  9/1987  La Garde et al. .................. 524/266
4,810,577  3/1989  Ikegaya .............................. 428/391

FOREIGN PATENT DOCUMENTS 227971  6/1984  Japan .
112431  5/1985  Japan .
 72505  3/1986  Japan .

OTHER PUBLICATIONS

ANSI-ASTMD 1329-1379.
Japanese Industrial Standards No. K 6301; 1975.

*Primary Examiner*—Melvyn I. Marquis
*Assistant Examiner*—Karen A. Hellener
*Attorney, Agent, or Firm*—Robert Spector

[57] ABSTRACT

Curable fluororubber compositions comprising an organic fluororubber, an organopolysiloxane gum and an epoxy-containing organoalkoxysilane or partial hydrolyzate thereof, a reinforcing filler and an organoperoxide are characterized by excellent roll workability during roll milling and can be cured to yield a fluororubber which undergoes little deterioration in its mechanical properties at low temperatures.

3 Claims, 1 Drawing Sheet

FLUORORUBBER COMPOSITIONS EXHIBITING IMPROVED WORKABILITY AND MECHANICAL PROPERTIES

BACKGROUND OF THE INVENTION

1. Field of the Invention

The present invention relates to fluororubber compositions. More particularly, this invention relates to peroxide-curable fluororubber compositions exhibiting improved process-ability during roll milling and acceptable physical properties at temperatures below 0 degrees centigrade.

2. Background Information

Due to their excellent mechanical properties, heat resistance, oil resistance, and chemical resistance fluororubbers are used in a wide range of industrial applications. One shortcoming of this type of rubber is the poor workability or processability of curable compositions on roll-type rubber mills. In addition, cured fluororubbers typically exhibit relatively poor mechanical properties at temperatures below zero degrees Centigrade.

Japanese Patent Publication No. 59/227971, which issued on Dec. 21, 2984 discloses a friction material prepared by blending a silicone rubber, a fluororubber, a reinforcing fiber, a friction-imparting agent, a vulcanizing agent and a vulcanizing assistant. The resultant material is kneaded, rolled, frozen, and finally ground. The particles are then blended with other ingredients to form a paper.

Japanese Patent Publication No. 60/112431, published on Jun. 18, 1985 describes compositions suitable for use as the outer layer of a fixing roll in an electrostatic copier. The material used to form the layer is prepared by blending a curable silicone rubber with a dispersion of a fluororubber in a mixture of a silicone oil and either water or an organic liquid.

Japanese Patent Publication No. 61/72505, published on Apr. 14, 1986 teaches various compositions for preparing vulcanization bladders used during the vulcanization of rubber articles such as tires. One of the numerous compositions that can be used is a mixture of a silicone rubber and a fluororubber.

U.S. Pat. No. 4,810,577, which issued to Ikegaya on Mar. 7, 1989 discloses insulation materials for electrical wires that are blends of a vinylidene fluoride-based fluororubber and a silicone rubber. The silicone rubber reduces adhesion of the insulation material to the conductor without adversely affecting the oil resistance or mechanical strength of the fluororubber.

The present inventors have discovered that when a fluororubber is combined with an organopolysiloxane gum and an epoxy-substituted organoalkoxysilane the aforementioned shortcomings associated with cured and uncured prior art fluororubber compositions are eliminated without adversely affecting other desirable properties of the unmodified fluororubber. The present invention is based on this discovery.

An objective of this invention is to provide a fluororubber composition which prior to curing exhibits excellent workability on a roll mill and yields a cured rubber exhibiting acceptable low-temperature mechanical properties of the cured material.

SUMMARY OF THE INVENTION

The objective of this invention is achieved by blending the fluororubber with a peroxide-curable organopolysiloxane gum, an epoxy-substituted organoalkoxysilane, a reinforcing filler and an amount of an organic peroxide sufficient to cure both the fluororubber and the gum.

DETAILED DESCRIPTION OF THE INVENTION

Figure 1:
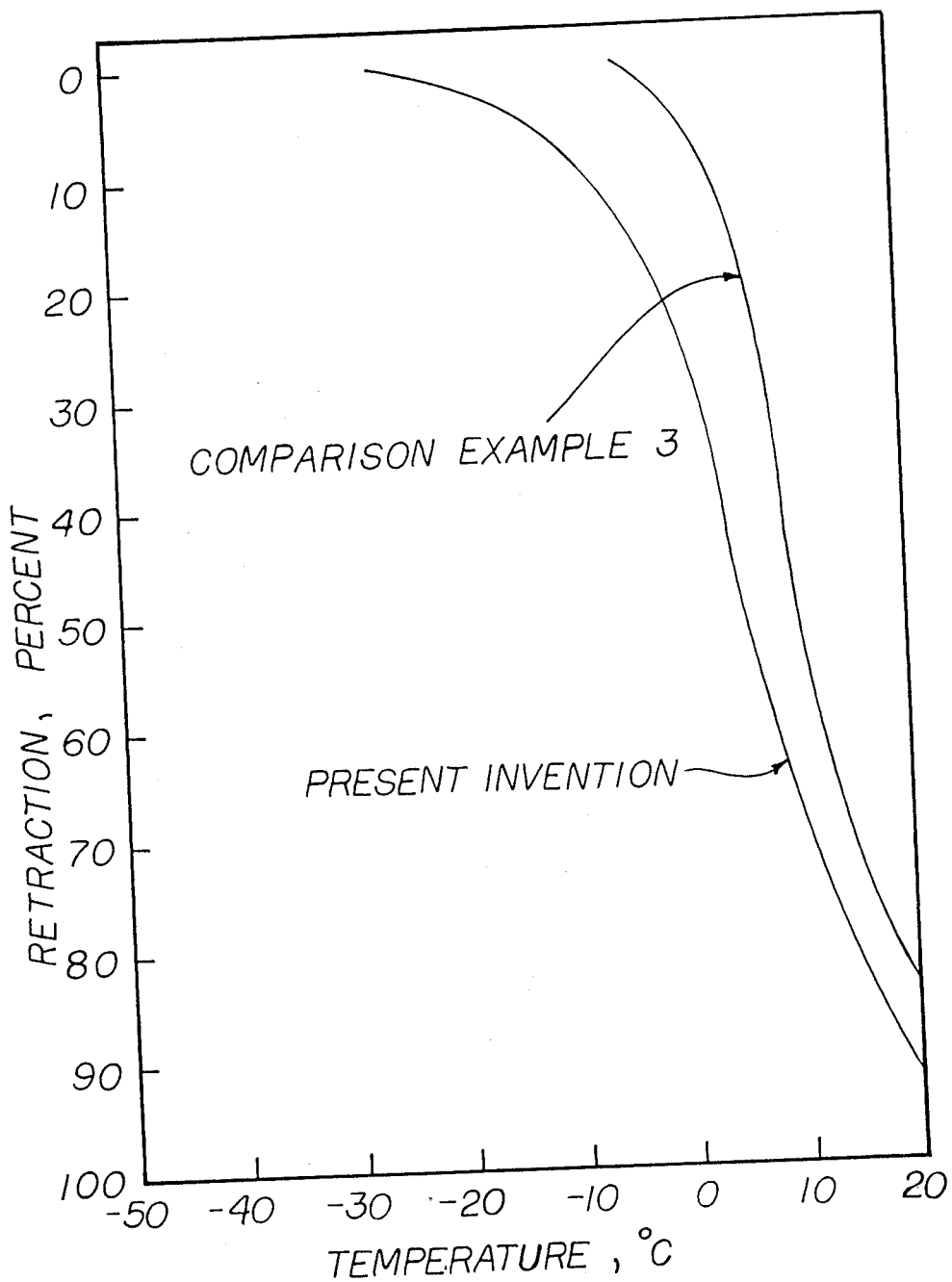
FIG. 1 is a plot of retraction as a function of temperature for a cured fluororubber sample of this invention and a control sample. The values were obtained using ASTM test procedure D 1329-79.

The present invention provides a fluororubber composition comprising (A) 100 parts by weight of a peroxide-curable organic fluororubber, (B) 1 to 60 parts by weight of a peroxide-curable organopolysiloxane gum, (C) 0.1 to 30 parts by weight of an epoxy group-containing organoalkoxysilane or a partial hydrolysis product thereof, (D) 1 to 60 parts by weight of a reinforcing filler, and (E) as the curing agent, an amount of an organoperoxide sufficient to cure said fluororubber and said gum.

The Fluororubber (Component A)

The fluororubber portion of the present compositions includes those fluororubbers having a fluorine-containing organic polymer as the base component and which cure in the presence of an organoperoxide to yield a rubbery elastic material. Fluororubbers are described, for example, in a Japanese language publication whose translated title reads "Compendium of Synthetic Rubber Processing Technology; Fluororubber/Silicone Rubber" written by Yuzuru Komeya et al., and published by Kabushiki Kaisha Taisei-sha.

Examples of suitable organic fluororubbers included but are not limited to copolymers of vinylidene fluoride with chlorotrifluoroethylene, pentafluoropropene, or hexafluoropropene.

The Organopolysiloxane Gum (Component B)

The organopolysiloxane gum of the present compositions can be any of the high-molecular weight organopolysiloxanes typically used as the base component of gum-type silicone rubbers. No specific restrictions apply to these organopolysiloxanes so long as they exhibit rubbery elasticity upon curing. It is generally preferred that the gum exhibit a plasticity number of at least 100. Plasticity can be determined using ASTM test method D 926.

Examples suitable organopolysiloxane gums include but are not limited to:

trimethylsiloxy-terminated dimethylsiloxane-methylvinylsiloxane copolymers, dimethylvinylsiloxy-terminated dimethylpolysiloxanes, dimethylvinylsiloxy-terminated dimethylsiloxane-methylvinylsiloxane copolymers, trimethylsiloxy-terminated 3,3,3-trifluoropropylmethylsiloxane-methylvinylsiloxane copolymers, dimethylvinylsiloxy-terminated 3,3,3-trifluoropropylmethylsiloxanedimethylsiloxane copolymers, and hydroxyl-terminated 3,3,3-trifluoropropylmethylsiloxane-methylvinylsiloxane copolymers.

Organopolysiloxanes wherein at least a portion of the silicon atoms are bonded to a 3,3,3-trifluoropropyl radical are preferred for use in the present compositions.

Too low a concentration of component B will not significantly improve the poor low-temperature mechanical strength exhibited by the fluororubber, while an excess of component B results in a decrease in some desirable properties of the unmodified fluororubber. Accordingly, the concentration of component B should be from 1 to about 60 parts by weight, preferably from 1 to about 30 parts by weight, per 100 parts by weight of component A.

The Epoxy-Containing Organoalkoxysilane (Component C)

The presence of an epoxy-containing organoalkoxysilane or a partial hydrolysis product of such a silane is not only required to achieve a homogeneous mixture of components A and B, but is also essential for optimizing the advantages of the present invention achieved by blending components A and B.

Examples of component C include but are not limited to gamma-glycidoxypropyltrimethoxysilane, gamma-glycidoxypropyltriethoxysilane, gamma-glycidoxypropylmethyldimethoxysilane, and beta-(3,4-epoxycyclohexyl)ethyltrimethoxysilane.

The beneficial effects imparted by this component are not evident when it is present in too low a concentration, while an excess of this component adversely affects the workability of the curable composition during roll milling. Accordingly, the concentration of component C in the curable composition should be from 0.1 to 30 parts by weight, preferably from 0.5 to 15 weight, parts per 100 weight parts component A. In addition, it is also preferred that the concentration of component C fall within the range of from 0.3 to 10 parts by weight per 100 parts by weight of component B.

Partial hydrolysis products of alkoxysilanes, including those suitable for use as component C are well known to those skilled in the chemistry of organosilicon compounds. A portion or all of component C in the present compositions can be replaced by its partial hydrolysis product.

The Reinforcing Filler (Component D)

The presence of a reinforcing filler is responsible for the excellent mechanical properties of the present compositions following curing. The reinforcing filler can be any of those typically used in fluororubber and/or silicone rubber compositions, and no specific restriction apply to this material. Useful reinforcing fillers include but are not limited to dry-method silica, also referred to as fume silica, wet-method silica, also referred to as precipitated silica, and carbon black. The concentration of reinforcing filler is typically from 1 to 60 parts by weight per 100 parts of fluororubber (component A).

The Organoperoxide (Component E)

The present compositions are cured using an organoperoxide as the curing agent or catalyst. No specific limitations apply to the organoperoxide so as long as it is capable of bringing about the curing of both the fluororubber and the organopolysiloxane gum. Useful peroxides include but are not limited to benzoyl peroxide, 2,4-dichlorobenzoyl peroxide, dicumyl peroxide, and 2,5-dimethyl-2,5-di(t-butylperoxy)hexane. The concentration of peroxide is typically from 0.1 to 10 percent by weight based on the weight of component A.

Preparation of Curable Compositions

The fluororubber compositions of the this invention can be easily prepared by simply mixing the aforementioned components A, B, C, D, and E to homogeneity using any of the known techniques, which include but are not limited to blending using a two- or three-roll rubber mill or dough-type mixer.

EXAMPLES

The present invention will be explained in greater detail through the following illustrative examples. Unless otherwise specified all parts and percentages are by weight and viscosity values are determined at 25 degrees Centigrade.

EXAMPLE 1

70 Parts of a vinylidene fluoride-based fluororubber available as Dai-el G901 from Daikin Kogyo Company, Limited, 20 parts of a wet-method (precipitated) silica with a specific surface area of 200 m2/g, 30 parts of a hydroxyl-terminated 3,3,3-trifluoropropylmethylsiloxane-methylvinylsiloxane copolymer gum, and 2 parts of gamma-glycidoxypropylmethyldimethoxysilane were blended to homogeneity in a kneader-type mixer. 0.75 Parts 2,5-dimethyl-2,5-di(t-butylperoxy)hexane and 1.25 parts triallyl isocyanurate were added to the resulting mixture followed by blending of the ingredients on a two-roll mill to yield a curable fluororubber composition of this invention.

The fluororubber composition did not stick to the surface of the two-roll mill during blending, and the workability of the composition on the roll was excellent, as evidences by the fact that a homogeneous composition was prepared in 12 minutes of milling time.

The fluororubber was cured by heating at 170 degrees Centigrade. The hardness, tensile strength, elongation, modulus and tear strength of the fluororubber following curing were measured in accordance with the procedures described in Japan Industrial Standards (JIS) K 6301, which is available in an English translation. The results of these measurements are reported in Table 1.

The low-temperature retraction of an elongated sample was measured according to the method (TR test) described in ASTM test procedure D-1329, and these results are plotted on the graph represented in the accompanying drawing identified as FIG. 1.

For comparison, a fluororubber composition (Comparison Example 1) was prepared as described in the first part of this example, but omitting the 3,3,3-trifluoropropylmethylsiloxane-methylvinylsiloxane copolymer gum. A fluororubber composition (Comparison Example 2) was also prepared as described in the preceding section of this example above, but omitting the gamma-glycidoxypropylmethyldimethoxysilane. Finally, a fluororubber composition (Comparison Example 3) was prepared as described in this example, but omitting both the 3,3,3-trifluoropropylmethylsiloxane-methylvinylsiloxane copolymer and the gamma-glycidoxypropylmethyldimethoxysilane. The mechanical properties of these compositions were measured as described in the preceding section of this example, and these results are also reported in Table 1 as Comparison Examples 1, 2, and 3.

The accompanying drawing identified as FIG. 1 plots the results of the low temperature retraction (TR) test conducted on (1) the fluororubber composition of the present invention and (2) the composition identified as Comparison Example 3.

TABLE 1.

|  | Present Invention | Comparison Example 1 | Example 2 | Example 3 |
|---|---|---|---|---|
| Specific gravity | 1.707 | 1.536 | 1.710 | 1.87 |
| Hardness | 76 | 76 | 81 | 90 |
| Tensile strength, kg/cm$^2$ | 143 | 108 | 112 | 163 |
| Elongation, % | 260 | 273 | 283 | 205 |
| 100% modulus, kg/cm$^2$ | 50 | 36 | 43 | 65 |
| Tear strength, kg/cm | 31 | 28 | 33 | — |

EXAMPLE 2

The following ingredients were introduced into a kneader extruder and mixed to homogeneity: 70 parts vinylidene fluoride-based fluororubber (Dai-el G901 from Daikin Kogyo Company, Limited), 30 parts dimethylvinylsiloxy-terminated 3,3,3-trifluoropropylmethylsiloxane-dimethylsiloxane copolymer gum (plasticity no.=300), 20 parts wet-method silica with a specific surface area of 200 m2/g, and 2 parts gamma-glycidoxypropyltrimethoxysilane.

The operating conditions of the kneader/extruder were as follows:
kneading temperature (temperature at the center of the kneader/extruder)=100 degrees Centigrade,
temperature at extrusion discharge=180 degrees Centigrade,
extrusion rate=1 kg/hour.

0.75 Parts 2,5-dimethyl-2,5-di(t-butylperoxy)hexane and 1.25 parts triallyl isocyanurate were subsequently added to the mixture obtained from the kneader/extruder, and this mixture was blended on a two-roll mill to yield a curable fluororubber composition. The composition was then cured and the mechanical properties of the fluororubber measured using the procedures described in Example 1. The results are reported in Table 2.

TABLE 2

| Specific gravity | 1.689 |
|---|---|
| Hardness | 78 |
| Tensile strength, kg/cm2 | 147 |
| Elongation, % | 264 |
| 100 modulus, kg/cm2 | 57 |
| Tear strength, kg/cm | 36 |

That which is claimed is:

1. A curable fluororubber composition comprising
   (A) 100 parts by weight of a peroxide-curable organic fluororubber,
   (B) 1 to 60 parts by weight of a peroxide-curable organopolysiloxane gum,
   (C) 0.1 to 30 parts by weight of an epoxy group-containing organoalkoxysilane or partial hydrolyzate thereof,
   (D) 1 to 60 parts by weight of a reinforcing filler, and
   (E) An amount of an organic peroxide sufficient to cure said fluororubber and said gum.

2. A composition according to claim 1 where at least a portion of the silicon atoms of said gum are bonded to 3,3,3-trifluoropropyl radicals, the concentration of said gum is from 1 to 30 parts by weight per 100 parts of said fluororubber, the concentration of said epoxy-substituted alkoxysilane is from 0.5 to 15 parts by weight per 100 parts of said fluororubber, and the concentration of said peroxide is from 0.1 to 10 parts by weight per 100 parts of said fluororubber.

3. A composition according to claim 1 where the concentration of said epoxy-substituted silane is from 0.3 to 10 parts by weight per 100 parts by weight of said gum and said peroxide is benzoyl peroxide, 2,4-dichlorobenzoyl. peroxide, dicumyl peroxide or 2,5-dimethyl-di(t-butylperoxy)hexane.

* * * * *